United States Patent [19]
Radenovic

[11] 3,975,971
[45] Aug. 24, 1976

[54] SHIFT MECHANISM FOR STANDARD TRANSMISSION

[76] Inventor: Branko J. Radenovic, Apartment 2, 1138 Davenport Road, Toronto, Ontario, Canada

[22] Filed: June 2, 1975

[21] Appl. No.: 582,904

[52] U.S. Cl. .............................................. 74/473 R
[51] Int. Cl.² ....................... G05G 9/02; G05G 9/16
[58] Field of Search .......... 74/471 XY, 473 R, 475, 74/476, 477

[56] References Cited
UNITED STATES PATENTS

| | | | |
|---|---|---|---|
| 1,638,182 | 8/1927 | Butell | 74/473 R |
| 1,712,938 | 5/1929 | Short et al. | 74/473 R |
| 2,265,260 | 12/1941 | Argo | 74/473 R X |
| 3,563,110 | 2/1971 | Hauser | 74/473 R |
| 3,744,336 | 7/1973 | Lancaster | 74/473 R |

Primary Examiner—Allan D. Herrmann

[57] ABSTRACT

A shifting mechanism for a manual transmission comprises first and second slide members and a shifting means for selectively shifting the first or second slide members in a to and fro direction. The first and second slide members are connected respectively to a first shifting arm and a second shifting arm of a transmission at one end of each of the slide members. At the other end of each of the slide members, means is provided which permits the first and second slide members to move independently of the respective second and first shifting arms of the transmission. The shifting means is adapted to move a selected first or second slide member independently of the other slide member whereby the corresponding first or second shifting arm is moved to and fro while the other shifting arm remains stationary. The shifting mechanism may be used on a three-speed standard transmission and the like.

8 Claims, 11 Drawing Figures

SHIFT MECHANISM FOR STANDARD TRANSMISSION

FIELD OF THE INVENTION

This invention relates to a shifting mechanism for a manual transmission and more particularly, to a shifting mechanism which is connected directly to transmission gear shifting arms.

BACKGROUND OF THE INVENTION

With existing manual transmissions, a transmission linkage is required to transfer the shifting movement of a transmission shifting mechanism to the transmission in order to shift the transmission gears. Such transmission linkages are usually exposed underneath the vehicle to mud, dust, etc. so that during use of the transmission, the transmission shifting linkages become stuck thereby locking the manual transmission in a particular gear. A further drawback of transmission shifting linkages is that they require continual adjustment to ensure a proper shifting of the gears in the transmission.

It is therefore an object of the invention to provide a transmission shifting mechanism which does not require the use of a transmission linkage, thereby overcoming the problem of transmission linkage adjustments and transmission linkage seizure.

It is another object of the invention to provide a transmission shifting mechanism where the slide members of the shifting mechanism are connected directly to shifting arms of a manual transmission.

It is a further object of the invention to provide a transmission shifting mechanism which is compact in structure, readily accessible, easily serviced and requires minimum maintenance.

It is yet another object of the invention to provide a compact transmission shifting mechanism which may be covered to protect the shifting mechanism from dirt, mud and the like.

It is a further object of the invention to provide a shift lever which pivots about two axes which are perpendicular to each other and lie in the same plane and which is adapted to selectively engage the slide members of the transmission shifting mechanism to shift the transmission into a desired gear.

BRIEF SUMMARY OF THE INVENTION

The invention provides a shifting mechanism for a manual transmission which has first and second spaced apart transmission gear shifting arms. The shifting mechanism comprises first and second slide members and a shifting means for selectively shifting the first or second slide members in a to and fro direction. The first slide member has one end pivotally connected to a first shifting arm and has at the other end, means for connecting the first slide member to a second shifting arm which permits the first slide member to move to and fro independently of a second shifting arm. The second slide member has one end pivotally connected to a second shifting arm and has at the other end thereof, means for connecting the second slide member to a first shifting arm which permits the second side member to move to and fro independently of a first shifting arm. The shifting means is adapted to move a selected first or second slide member independently of the other slide member whereby the corresponding first or second shifting arm is moved to and fro while the other shifting arm remains stationary.

A shift lever may be provided to shift the slide members where the shift lever when assembled on a transmission is pivotally mounted at a point above the slide members. The shift lever pivots about first and second axes which are perpendicular to each other and which lie in substantially the same plane. The shift lever is so mounted above the slide members that the lower end of the shift lever selectively engages either slide member when pivoted about one of the axes and moves the selected slide member in a to and fro direction when pivoted about the other axis.

The shift lever may engage the slide members at a location which is between a first and second shifting arm of a transmission so that as the shifting arms rotate relative to each other during transmission shifting, the slide members move up and down a relatively small distance.

BRIEF DESCRIPTION OF THE DRAWINGS

These and other objects, advantages and features of the invention will become apparent in the following detailed description of the preferred embodiments of the invention as shown in the drawings, wherein.

DETAILED DESCRIPTION OF THE PREFERRED EMBODIMENTS

Figure 1:
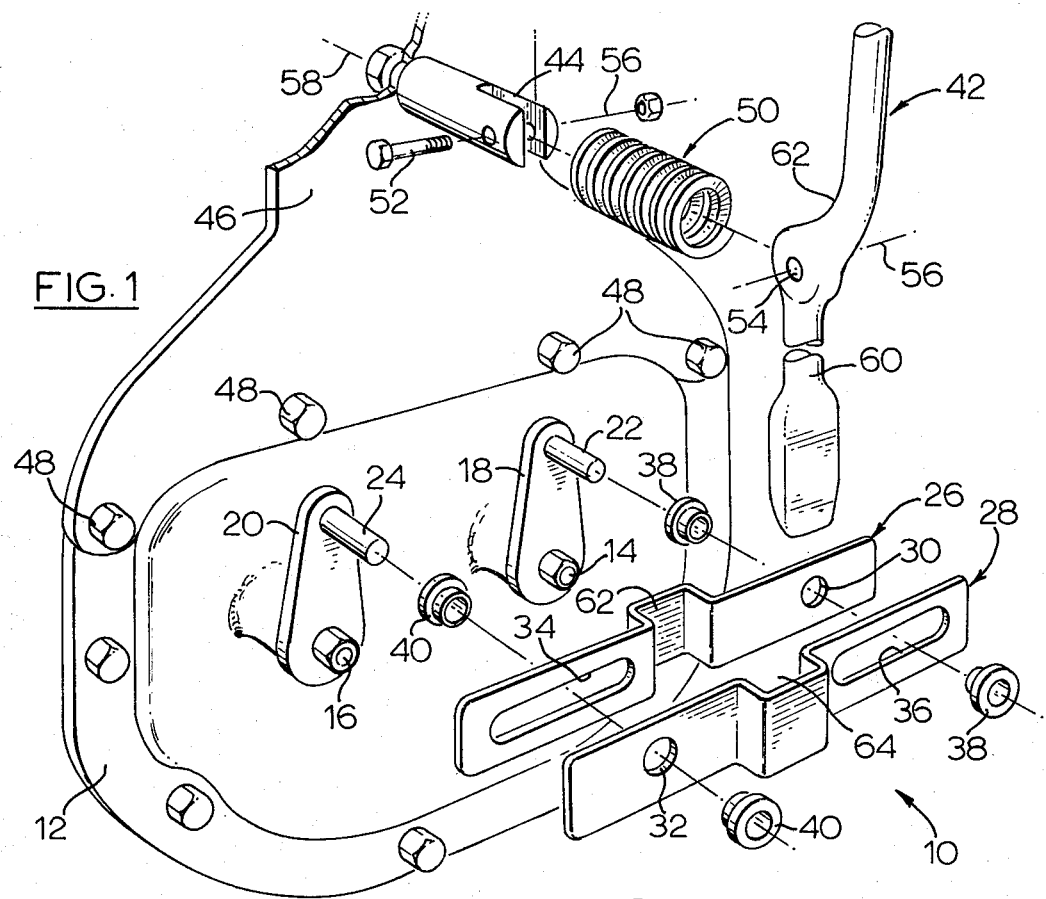
FIG. 1 is an exploded view of the shifting mechanism which is to be attached to a manual transmission having two shifting arms.
Figure 2:
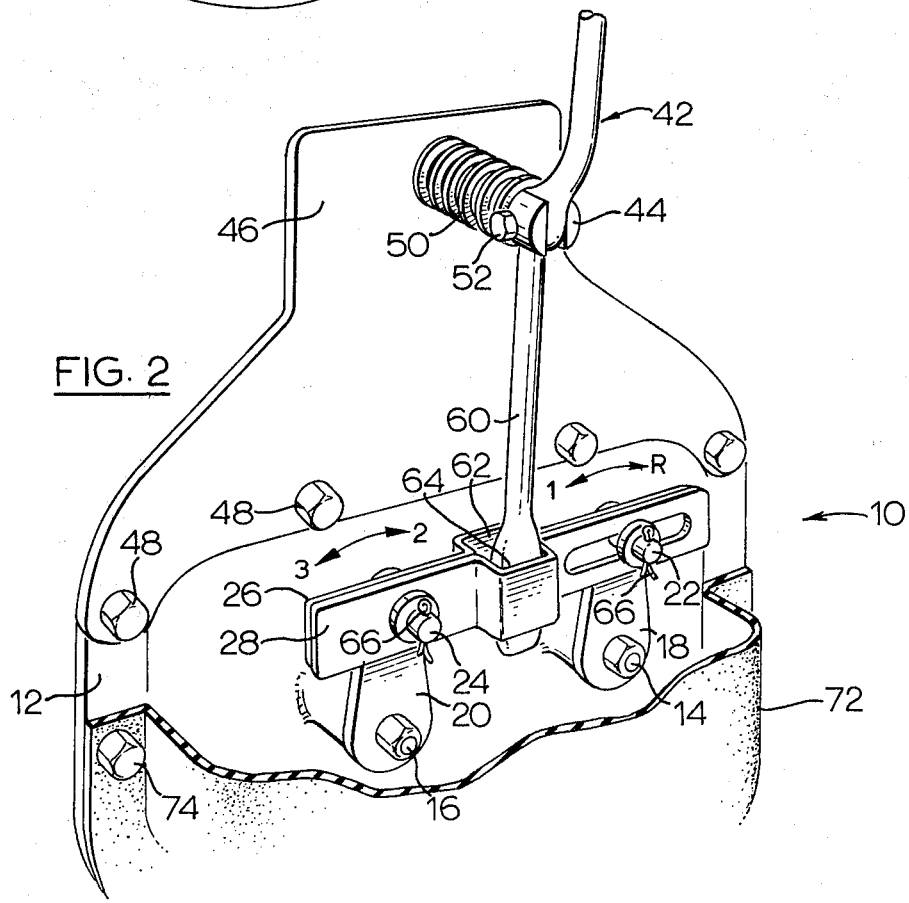
FIG. 2 is a side view showing the shifting mechanism connected to a manual transmission.

A preferred embodiment of the transmission shifting mechanism according to this invention is designated 10 in FIG. 1 of the drawings. The shifting mechanism 10 is connected to a manual transmission having a cover plate 12 and first and second shifting rods 14 and 16. Rigidly connected to the shifting rods 14 and 16 are first and second shifting arms 18 and 20. At the upper ends of each of these shifting arms are secured first and second pins 22 and 24. The shifting arms 18 and 20 are mounted on shifting rods 14 and 16 in a manner which permits free rotation of the shift rods 14 and 16 without interference between the shifting arms and the cover 12. As shown in FIG. 2, rotation of shifting rod 14 by shifting arm 18 shifts a transmission into and out of first and reverse gears. Similarly, shifting rod 16 shifts a transmission into and out of second and third gears.

The shifting mechanism 10 comprises a first shifting slide 26 and a second shifting slide 28. The first slide member 26 has an aperture 30 which is adapted to receive pin 22 and permit pivoting of the first slide member 26 relative to the first shifting arm 18. Similarly, second slide member 28 is provided with aperture 32 which is adapted to receive pin 24 to permit the second slide member 28 to pivot relative to the second shifting arm 20.

First slide member 26 is provided at the other end thereof with a slot 34 which extends longitudinally of the slide member and which is adapted to receive pin 24 of the second shifting arm 20. Similarly, second slide member 28 is provided with a slot 36 which extends longitudinally of the slide member and which is adapted to receive pin 22 of the first shifting arm 18.

Split bushings 38 and 40 are provided on pins 22 and 24 and extend through the apertures and the slots of the first and second slide members to ensure free pivoting movements and sliding movements of the slide members 26 and 28 relative to the shifting arms 18 and 20.

When the shifting mechanism is assembled, a shift lever 42 is mounted above the slide members 26 and 28 by a yoke 44. Yoke 44 is bearing mounted in plate 46 so that yoke 44 pivots about axis 58. Plate 46 is secured to the transmission cover 12 by bolts 48. A coiled spring 50 is slid over and concentric with yoke body portion 44. The shift lever 42 is connected to yoke 44 by bolt and nut 52 which extends through the hole 54 provided in the shift lever 42. The shift lever 42 is permitted to pivot about a first axis 56 and a second axis 58 which are substantially perpendicular to each other and lie in substantially the same plane. The first axis 56 extends substantially in the same direction as the slide members 26 and 28. The coiled spring 50 urges the lower portion 60 of the shift lever in an outward direction away from the plate cover 12 because of the outward bend 62 provided upwardly of the point of connection of the shift lever 42 to yoke 44.

First slide member 26 is provided with a recess 62 which is adapted to receive the lower end 60 of the shift lever. Similarly, second slide member 28 is provided with recess 64 which is also adapted to receive the lower end 60 of the shift lever.

FIG. 2 shows the shifting mechanism of the invention assembled on a standard transmission. Cotter pins 66 are used to complete the connection of the first and second slide members 26 and 28 to pins 22 and 24. The shifting lever 42 is shown in its "neutral" position with spring 50 biasing the bottom portion 60 of the shift lever in an outward direction so that it engages recess 64 of second slide member 28.

The shifting mechanism is very compact in structure and requires no transmission linkages since the slide members 26 and 28 are connected directly to the shifting arms. Due to the compactness of the shifting mechanism, a flexible rubber boot 72 may be secured to the transmission plate 12 by bolts 74 where the rubber boot 72 surrounds (not shown) the lower end 60 of the shift lever to provide a barrier for the shifting mechanism to mud and the like.

Figure 5:
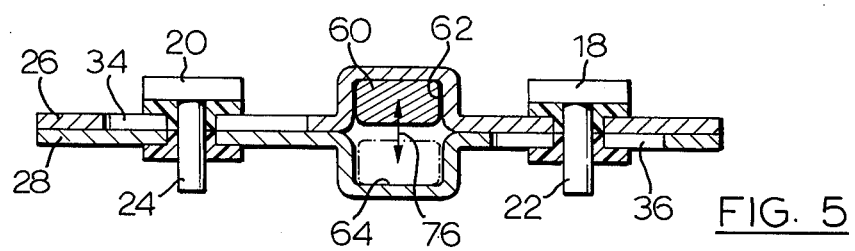
FIG. 5 shows the shifting mechanism in a position where the transmission is in "neutral".
Figure 6A:
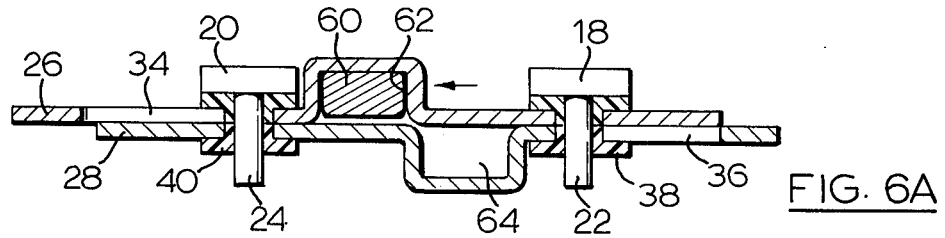
Figure 7A:
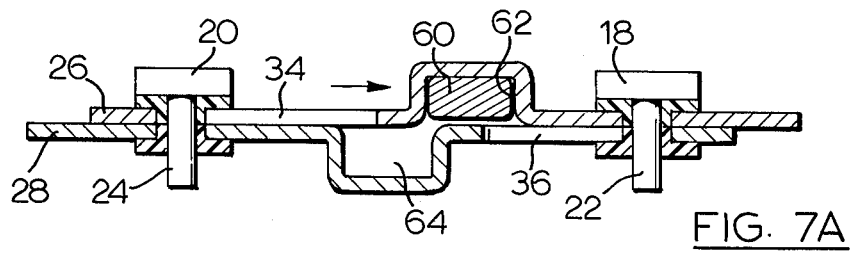

Shifting arms 18 and 20 as shown in FIG. 2 are in their "neutral" positions so that recesses 62 and 64 of the first and second slide members oppose each other and are aligned. The "neutral" position of the slide members is shown in section in FIG. 5 where the shift lever is pivoted about the first axis 56 in the direction of arrow 76 to move the lower portion 60 of the shift lever from recess 64 to recess 62 of the slide member.

Figure 3:
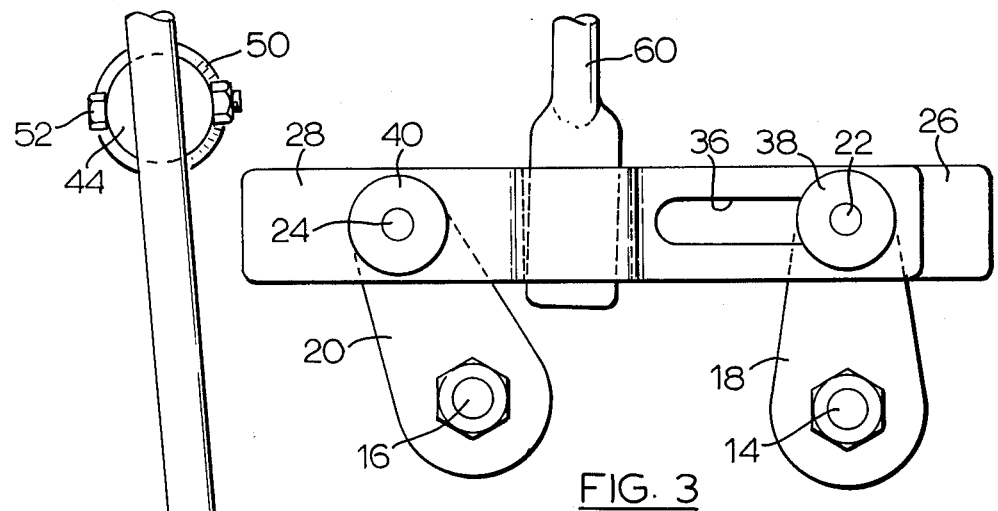
FIGS. 3, 4, 6 and 7 show the shifting mechanism in several positions whereby the pair of shifting arms are moved to and fro to shift the transmission to a desired gear.
Figure 4:
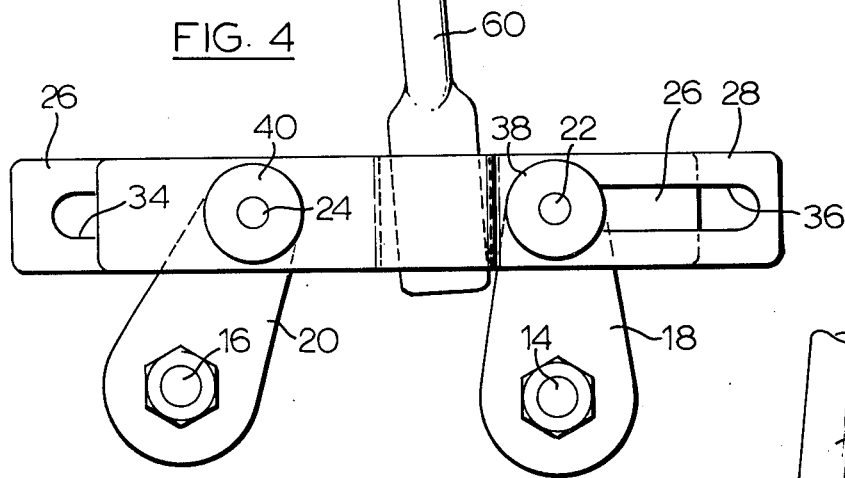
Figure 6:
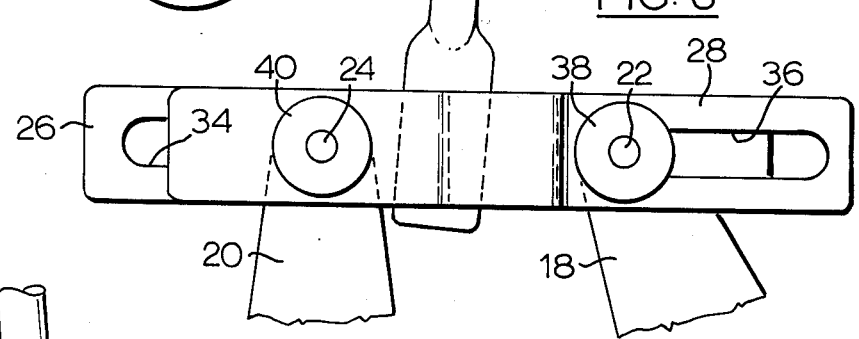
Figure 7:
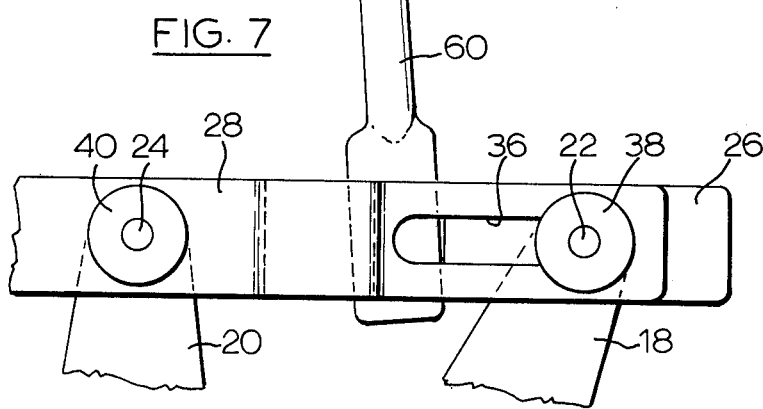
Figure 3A:
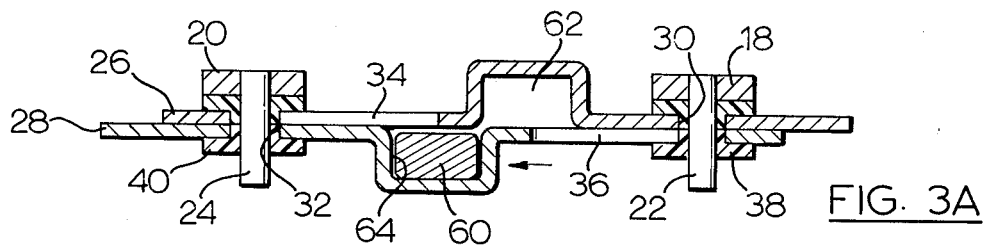
FIGS. 3a, 4a, 6a and 7a are respective sections through FIGS. 3, 4, 6 and 7 showing the positioning of the shifting arms of the transmission when shifted by the shifting mechanism of this invention.
Figure 4A:
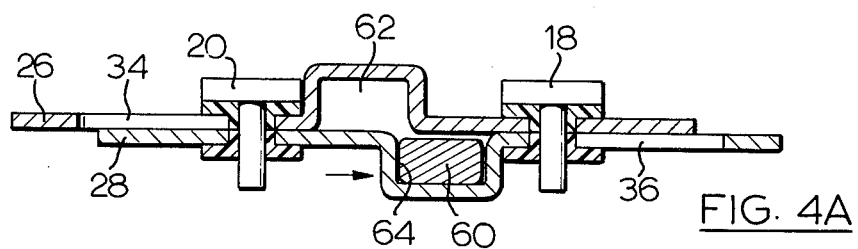

Referring to FIGS. 3, 4, 6, 7 and 3a, 4a, 6a and 7a the shifting of the first and second shifting arms of the transmission is shown by movement of shift lever 42. Due to the provisions of slots 34 and 36, movement of first slide member 26 by shift lever 42, moves shift arm 18 to and fro where the slot 34 is of a longitudinal length which permits the second shift arm 20 to remain stationary during such movement of the first shift arm 18. Similarly, slot 36 is of a longitudinal length that movement of the second slide member 28 moves the second shift arm 20 while the first shift arm 18 remains stationary. FIG. 3 shows the lower portion 60 of the shift lever inserted in recess 64 to shift the second slide member 28 and in turn shift the transmission into the third gear position. Shift arm 18 remains stationary in an upright position during movement of slide member 28. The shifting of the slide member 28 is achieved by pivoting the shift lever in a clockwise direction about axis 58. In FIG. 4, with the lower portion 60 of the shift lever in recess 64, the shift lever is pivoted in a counterclockwise direction about axis 58 to move the slide member 28 backwards to shift the second shifting arm 20 into the second gear position while the first shifting arm 18 remains stationary in an upright position.

When it is desired to shift the first shifting arm 18 to its first and reverse positions, the lower portion of the shift lever 60 is positioned in recess 62 of the first slide member 26 and rotated in a clockwise direction about axis 58 to move shifting arm 18 to first gear position. To move the shifting arm 18 to the reverse gear position, the shift lever 42 is rotated in a counterclockwise direction about its axis 58 to move the shift arm 18 into the reverse gear position. FIGS. 3a, 4a, 6a and 7a show in section the positioning of the slide members 26 and 28 as they are moved by the shift lever to position the shift arms 18 and 20 in the desired gear position.

As shown in FIGS. 3, 4, 6 and 7 in having the recesses 62 and 64 positioned centrally between the shift arms 18 and 20 the slide members 26 and 28 move upwards and downwards a minimal distance. As the arms 18 and 20 rotate about the respective shifting rods 14 and 16, they traverse a minor arc so that the upwards and downwards movement of the slide members is minimized to the extent shown in these figures. With a minimal upwards and downwards movement of the slide members, withdrawal of the lower end 60 of the shift lever upwardly from recess 62 and 64 is precluded. A constant engagement of the shift lever lower end 60 with the selected recess 62 or 64 is assured.

A back-up light switch may be provided on the shifting mechanism and be adapted to be engaged by the first slide member 26 to activate the back-up light when the shifting arm 18 is in reverse position. A neutral switch may also be provided on the shifting mechanism to sense when the transmission is in "neutral" so as to control starting of the vehicle only when the transmission is in "neutral".

Although various preferred embodiments of the shifting mechanism according to this invention have been described herein in detail, it is understood that variations and modifications may be made thereto as would be apparent to those skilled in the art without departing from the spirit of the invention or the scope of the appended claims.

I claim:

1. A shifting mechanism for a manual transmission which has first and second spaced apart transmission gear shifting arms comprising first and second slide members, and a shifting means for selectively shifting said first or second slide member in a to and fro direction, said first slide member having one end pivotally connected to a first shifting arm and having at the other end means for connecting said first slide member to a second shifting arm which permits said first slide member to move to and fro independently of said second shifting arm, said second slide member having one end pivotally connected to said second shifting arm and having at the other end means for connecting said second slide member to said first shifting arm which permits said second slide member to move to and fro independently of said first shifting arm, said shifting means being adapted to move a selected first or second slide member independently of the other slide member whereby the corresponding first or second shifting arm is moved to and fro while the other shifting arm remains stationary.

2. A shifting mechanism of claim 1 wherein each said slide member is an elongate plate.

3. A shifting mechanism of claim 2 wherein a pin is provided on each shifting arm, each said slide member having an aperture at the end thereof which is adapted to receive a respective pin of said first or second shifting arm, each slide member having at the other end thereof an elongate slot extending longitudinally of the slide member, said slot being adapted to receive a respective pin of said first or second shifting arm, the longitudinal length of the slot being such that when said first or second slide member is moved to and fro, the respective second or first shifting arm remains stationary.

4. A shifting mechanism of claim 3 wherein said means for selectively shifting said slide members comprises a shift lever which, when assembled on a transmission, is pivotally mounted at a point above said slide members, said shift lever pivoting about first and second axes which are perpendicular to each other and lie in substantially the same plane, said first axis extending in substantially the same direction as said slide members, means for engaging the shift lever provided on each of said first and second slide members, said shift lever being so mounted above said slide members that the lower end of said shift lever selectively engages a selected means for engaging the shift lever of the first or second slide member when said shift lever is pivoted about said first axis, pivotal movement of said shift lever about said second axis moving the selected first or second slide member in a to and fro direction.

5. A shifting mechanism of claim 4 wherein said slide members are positioned beside each other as they are connected to the pins of said first and second shift arms, said means for engaging the shift lever comprising a recess on the inside surface of each slide member which is adapted to receive the lower end of said shift lever, said shift lever engaging said recess of a selected first or second slide member when said shift lever is pivoted about said first axis.

6. A shifting mechanism of claim 4 wherein said means provided on each of said first and second members are located between a first and second shifting arm.

7. A shifting mechanism of claim 6 wherein said slide members are positioned beside each other as they are connected to the pins of first and second shift arms, said means for engaging the shift lever comprising a recess on the inside surface of each slide member which is adapted to receive the lower end of said shift lever, said shift lever engaging a recess of a selected first or second slide member when said shift lever is pivoted about said first axis.

8. A shifting mechanism of claim 7 wherein a bushing is positioned on each pin and extends through the aperture and slot of the respective slide members.

* * * * *